United States Patent
Bentkovski

(10) Patent No.: US 8,675,063 B2
(45) Date of Patent: Mar. 18, 2014

(54) DEVICE, SYSTEM, AND METHOD OF REDUCED-POWER IMAGING

(75) Inventor: Yakov Bentkovski, Ness Ziona (IL)

(73) Assignee: Pima Electronic Systems Ltd., Holon (IL)

( * ) Notice: Subject to any disclaimer, the term of this patent is extended or adjusted under 35 U.S.C. 154(b) by 1254 days.

(21) Appl. No.: 11/884,777

(22) PCT Filed: Feb. 5, 2006

(86) PCT No.: PCT/IL2006/000138
§ 371 (c)(1),
(2), (4) Date: May 22, 2008

(87) PCT Pub. No.: WO2006/090359
PCT Pub. Date: Aug. 31, 2006

(65) Prior Publication Data
US 2008/0278580 A1    Nov. 13, 2008

Related U.S. Application Data

(60) Provisional application No. 60/655,433, filed on Feb. 24, 2005.

(51) Int. Cl.
*H04N 7/18* (2006.01)

(52) U.S. Cl.
USPC .......................................... 348/143; 348/148

(58) Field of Classification Search
USPC .................................................... 348/143, 148
See application file for complete search history.

(56) References Cited

U.S. PATENT DOCUMENTS

| | | | |
|---|---|---|---|
| 5,825,413 A | 10/1998 | Mullis | |
| 5,980,123 A | 11/1999 | Heifler | |
| 6,069,655 A | 5/2000 | Seeley et al. | |
| 6,133,830 A * | 10/2000 | D'Angelo et al. | 340/571 |
| 6,285,394 B1 * | 9/2001 | Huang | 348/143 |
| 6,992,585 B2 * | 1/2006 | Saleh et al. | 340/571 |
| 7,702,135 B2 * | 4/2010 | Hill et al. | 382/107 |

OTHER PUBLICATIONS

International Search Report for International Application No. PCT/IL06/00138 mailed Feb. 16, 2007.

* cited by examiner

*Primary Examiner* — David X Yi
(74) *Attorney, Agent, or Firm* — Occhiuti & Rohlicek LLP

(57) ABSTRACT

Devices, systems and methods of reduced-power imaging. For example, a device includes: an imager able to acquire one or more images; a triggering sensor able to sense a triggering event; and a receiver able to receive signals, wherein while the device is in a disarm mode the receiver is operational and the imager and the triggering sensor are not operational.

24 Claims, 2 Drawing Sheets

DEVICE, SYSTEM, AND METHOD OF REDUCED-POWER IMAGING

CROSS-REFERENCE TO RELATED APPLICATIONS

This application is a National Phase Application of PCT International Application No. PCT/IL2006/000138, entitled "DEVICE, SYSTEM, AND METHOD OF REDUCED-POWER IMAGING", International Filing Date Feb. 5, 2006, published on Aug. 31, 2006 as International Publication No. WO 2006/090359, which in turn claims priority from US Provisional Patent Application No. 60/655,433, filed Feb. 24, 2005, both of which are incorporated herein by reference in their entirety.

FIELD OF THE INVENTION

The present invention relates to the field of imaging and image acquisition, and, more particularly, to the field of imaging by security cameras and surveillance systems.

BACKGROUND OF THE INVENTION

Some security and surveillance cameras may include, for example, an imager (e.g., a Complementary Metal Oxide Semiconductor (CMOS) imager or a Charge Coupled Device (CCD) imager) which may be continuously operational and may constantly image a monitored area, thereby continuously consuming power. This may result in, for example, inefficient consumption of power, and may require the use of an external power source to constantly provide power to the imager.

SUMMARY OF THE INVENTION

Various embodiments of the invention provide, for example, devices, systems and methods for reduced-power imaging.

Some embodiments include, for example, a security or surveillance system including a camera operatively connected to a control unit, e.g., through a two-way wireless communication link. The system or one or more components of the system (e.g., the camera, an imager of the camera, the control unit, or the like) may be in one of a plurality of states, for example, an armed mode or a disarmed mode. The control unit may, for example, allow a user to bring the system or one or more components of the system (e.g., the camera, an imager of the camera, the control unit, or the like) into an armed mode or into a disarmed mode. For example, in disarmed mode, one or more components of the camera (e.g., the imager, a transceiver, a triggering sensor, a processor, or the like) may be de-activated, may be turned off, or may operate in a low-power mode, a reduced-power mode, a "sleep" mode, or a stand-by mode; whereas in armed mode, one or more components of the camera (e.g., the imager, a transceiver, a triggering sensor, a processor, or the like) may be activated or fully operational. In one embodiment, in disarmed mode, a transceiver of the camera may be operational and substantially all other components of the camera may be turned off; whereas in armed mode, multiple components of the camera may be operational, semi-operational, or in a stand-by mode awaiting to operate.

In some embodiments, the camera may be battery operated or self-powered, e.g., may include one or more rechargeable or non-rechargeable batteries or power-cells, and may not be operatively connected to an external power source.

In some embodiments, the camera or one or more components of the camera (e.g., an imager) may be in a non-activated mode, a turned-off mode, a low-power mode, or a reduced-power mode, during the time period in which the security system is in a disarmed mode.

In some embodiments, the control unit may be used to submit a disarm command to the camera e.g., in response to a user disarm command and through a two-way wireless communication link. In response to the disarm command, one or more components of the camera (e.g., the imager, a transceiver, a triggering sensor, a processor, or the like) may be de-activated or switched to a low-power mode or stand-by mode. In one embodiment, a transceiver of the camera (or substantially only the transceiver of the camera) may remain active and operational. In some embodiments, a searching or "sniffing" time interval of the transceiver may be increased or extended in disarmed mode, e.g., to further reduce power consumption by the transceiver.

In some embodiments, the control unit may be used to submit an arm command to the camera e.g., in response to a user arm command and through a two-way wireless communication link. In response to the arm command, one or more components of the camera (e.g., the imager, a transceiver, a triggering sensor, a processor, or the like) may be activated or brought into full-power mode, or may be brought into a stand-by mode in which one or more components await a triggering event or a signal to operate; in some embodiments, optionally, a pre-event image (or, for example, multiple images, a stream of images, a video clip, or the like) may be acquired by an imager of the camera.

In some embodiments, once the camera is in "armed" mode of operations, a triggering unit or sensor of the camera may be able to detect a triggering event (e.g., motion, movement, smoke, fire, or the like). In response to the detection of the triggering event, one or more event images (or, for example, multiple images, a stream of images, a video clip, or the like) may be acquired.

In some embodiments, optionally, once a triggering event is detected and an event image is acquired, the camera may wait a pre-defined delay period (e.g., three seconds, five seconds, thirty seconds, one minute, or the like), and then one or more post-event images (or, for example, multiple images, a stream of images, a video clip, or the like) may be automatically acquired by the camera.

In some embodiments, data representing the acquired images (or, for example, multiple images, a stream of images, a video clip, or the like) may be transmitted or uploaded from the camera to the control unit, e.g., through a two-way wireless communication link.

Some embodiments of the invention may allow, for example, reduced power consumption by the camera and/or by one or more components of the camera (e.g., the imager, a transceiver, a triggering sensor, a processor, or the like).

Some embodiments of the invention may allow, for example, automatic acquisition and transmission of a pre-event image, event-images, and post-event images. Embodiments of the invention may allow various other benefits, and may be used in conjunction with various other applications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
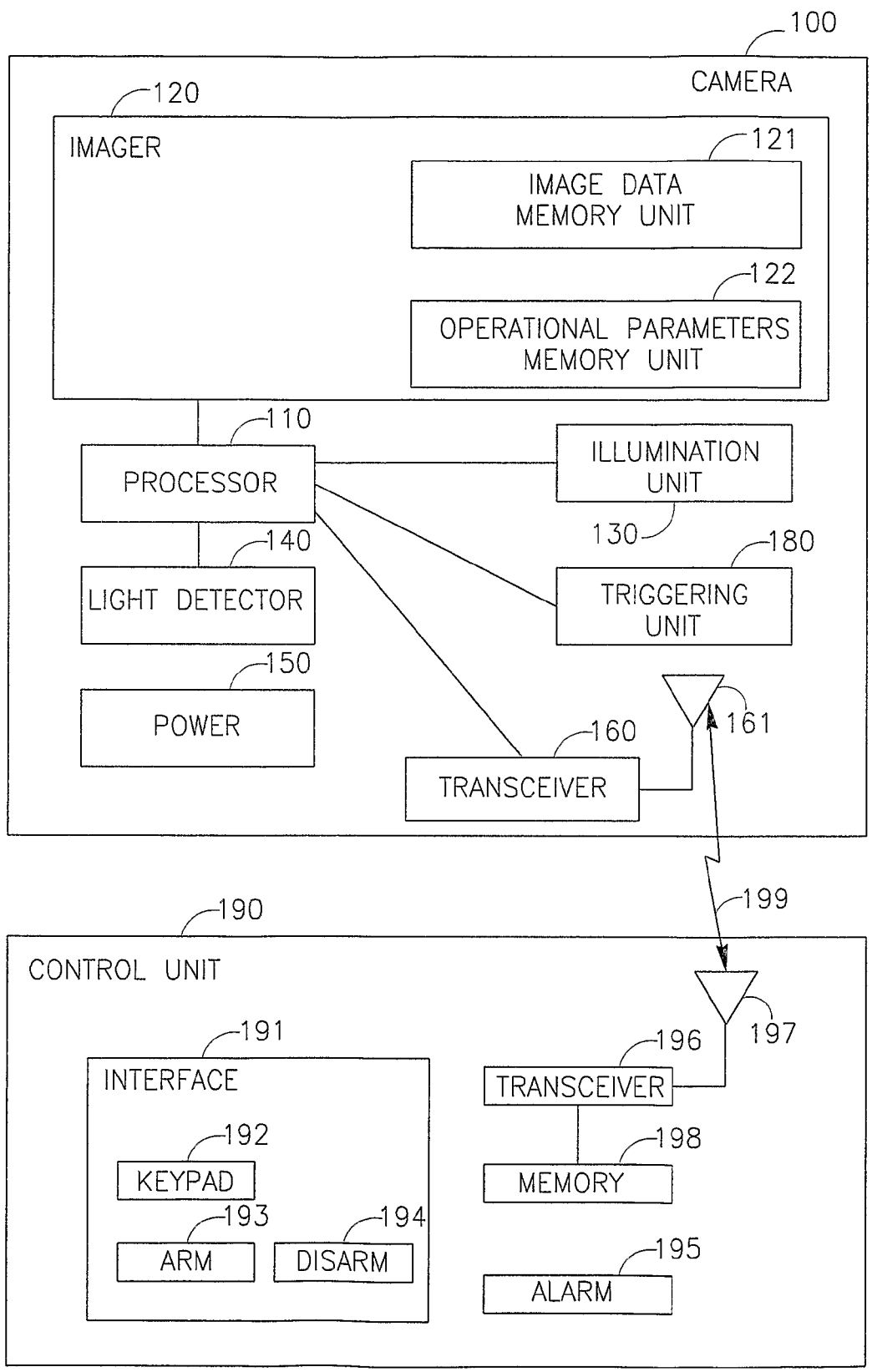
FIG. 1 is a schematic block diagram of a low-power security/surveillance system in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well-known features may be omitted or simplified in order not to obscure the invention.

FIG. 1 schematically illustrates a block diagram of a low-power security/surveillance system 170 in accordance with some embodiments of the invention. System 170 may include, for example, a control unit 190 which may be operatively connected to one or more security cameras, e.g., camera 100.

Camera 100 may be or may include, for example, a non-mobile camera, a Pan Tilt Zoom (PTZ) camera, a surveillance camera, a traffic camera, a digital camera, or other suitable image acquisition unit. Camera 100 may include, for example, an imager 120, a processor 110, an illumination unit 130, a power source 150, a transceiver 160, a triggering unit 180, and a light detector 140. Camera 100 may include other suitable hardware components and/or software components. In some embodiments, the components of camera 100 may be inter-connected or operatively associated, and may be enclosed in a suitable housing, enclosure, shell or packaging. Imager 120 may include, for example, a Complementary Metal Oxide Semiconductor (CMOS) imager, a Charge Coupled Device (CCD) imager, or other suitable image sensor or image acquisition unit. In one embodiment, for example, imager 120 may include a single-chip CMOS having an integrated image signal processor and a Joint Photographic Experts Group (JPEG) codec, e.g., imager model CoderCam TC5740 available from TransChip of Ramat Gan, Israel (www.TransChip.com), or other suitable imager.

Imager 120 may be able to acquire images in accordance with one or more standard or non-standard resolutions, for example, Video Graphics Array (VGA) resolution of 640 by 480 pixels, Quarter VGA (QVGA) resolution of 320 by 240 pixels, Sub-QVGA resolution of 160 by 120 pixels, Common Intermediate Format (CIF) resolution of 352 by 288 pixels, or other suitable resolutions. Imager 120 may acquire images in accordance with one or more standard or non-standard color depth, for example, 2 colors (e.g., black and white, or monochrome), 4 colors, 16 colors, 256 colors, 65,536 colors, or the like.

In some embodiments, image 120 may be able to acquire images illuminated by a visible light, e.g., white light or colored light. In alternate embodiments, image 120 may be able to acquire images illuminated by non-visible light, invisible light, Infra Red (IR) light, or near-IR light; in such cases, for example, imager 120 may not include an IR coating, e.g., to allow reception and acquisition of IR light, or imager 120 may include or may be an IR-sensitive imager.

Although part of the discussion herein may relate, for exemplary purposes, to camera 100 and/or imager 120 able to acquire images, embodiments of the invention are not limited in this regard and may be used, for example, in conjunction with camera 100 and/or imager 120 able to acquire video or image streams, and/or compressed or encoded image data and/or video data.

Imager 120 may include a memory unit 121 to store data of one or more images acquired by imager 120. The data stored in memory unit 121 may be non-compressed, compressed or encoded, e.g., in accordance with JPEG standard, Motion JPEG (M-JPEG) standard, Moving Picture Experts Group (MPEG) standard, MPEG-2 standard, MPEG-4 standard, or other suitable compression standards or encoding standards.

Imager 120 may optionally include a memory unit 122 to store values of one or more operational parameters of imager 120. The operational parameters may include, for example, exposure period of time (e.g., in milliseconds), frame capture rate (e.g., in frames per second), analog gain, digital gain, brightness level, contrast level, saturation level, hue level, gamma level, or other parameters. In one embodiment, imager 120 may not include a memory unit 122 to store values of operational parameters, and processor 110 may control (e.g., externally to the imager 120) such operational parameters and their corresponding values. In another embodiment, values of operational parameters may optionally be stored in, or set by, an imager controller, which may be integrated with imager 120 or operatively associated with imager 120.

In the exemplary embodiment shown in FIG. 1, memory units 121 and 122 may be implemented as two separate sub-units of imager 120. In other embodiments, memory units 121 and 122 may be implemented as one unit, or as more than two units or sub-units. In some embodiments, memory units 121 and 122 may be external to imager 120, for example, implemented as separate one or more units of camera 100 and operatively associated with imager 120.

Memory units 121 and/or 122 may include, for example, a Random Access Memory (RAM), a Dynamic RAM (DRAM), a Synchronous DRAM (SD-RAM), a Flash memory, a memory card, a memory stick, a volatile memory, a non-volatile memory, a cache memory, a buffer, a memory unit able to store a value or a result in a calculated equation or formula, a short term memory unit, a long term memory unit, a hard disk drive, a floppy disk drive, a Compact Disk (CD) drive, a CD-ROM drive, or other suitable removable or non-removable storage units or memory units. Illumination unit 130 may include, for example, one or more "flash" illumination units or Light Emitting Diodes (LEDs). In some embodiments, illumination unit 130 may include, for example, a solid-state high-brightness "flash"-type LED, a solid-state lamp, or a non-xenon illumination unit. In some embodiments, illumination unit 130 may be able to illuminate, for example, white light, colored light, or other visible light. In alternate embodiments, illumination unit 130 may be able to illuminate, for example, non-visible light, invisible light, IR light, or near-IR light. Illumination unit 130 may illuminate, for example, in response to an illumination command received from processor 110 and/or imager 120.

Light detector 140 may include, for example, a light sensor, a light meter or a light measurement unit able to sense, detect and/or measure light, e.g., the level of light, visible light, or ambient visible light in the area or room in which camera 100 is located. In some embodiments, light detector 140 may include a detector of visible light, or a detector non-sensitive to IR light. In one embodiment, for example, light detector 140 may include a visible light sensor model LX1970 available from Microsemi Integrated Products of California (www.MicroSemi.com), or other suitable light sensors. Optionally, in some embodiments, light detector 140 may include, or may be positioned in proximity to, a light tunnel or a suitable cone-shaped cavity, which may assist in focusing or trapping light for detection or measurement by light detector 140. In some embodiments, one or more readings of measure light may be used, for example, by processor 110, to calibrate the imager 120, to determine and set configuration values for operational parameters of imager 120, and/or to determine whether to activate the illumination unit 130 during image acquisition.

Processor 110 may include, for example, processor, a Central Processing Unit (CPU), a Digital Signal Processor (DSP), a microprocessor, a controller, a low-power processor or controller, a chip, a microchip, an Integrated Circuit (IC), an Application-Specific IC (ASIC), or any other suitable multi-purpose or specific processor or controller. In one embodiment, for example, processor 110 may include a mixed signal microprocessor model MSP430F135, model MSP430x13x, model MSP430x14x, or model MSP430x14x1, available from Texas Instruments of Texas (www.TI.com), or other suitable controller or processor. Processor 110 may, for example, send commands or instructions to imager 120 and/or illumination unit 130, send and/or receive data through transceiver 160, perform calculations in an image acquisition process, and/or control the operation of one or more components of camera 100. In one embodiment, processor 110 may be integrated with transceiver 160, for example, as a single component or as a single Integrated Circuit (IC). Transceiver 160 may include, for example, a two-way wireless transceiver. For example, transceiver 160 may transmit image data, acquired by imager 120 and/or stored in memory unit 121, to an external receiver or system, e.g., to control unit 190. Additionally or alternatively, transceiver 160 may receive data or instructions transmitted to camera 100 from an external transmitter or system, e.g., from control unit 190.

Transceiver 160 may include, for example, a transmitter-receiver unit or a transmitter unit and a receiver unit, and may operate in accordance with one or more wireless communication standards or protocols, for example, Bluetooth, ZigBee, 802.11, 802.11a, 802.11b, 802.11g, 802.16, Wi-Fi, WiMax, a proprietary wireless communication protocol, a customized or modified wireless communication protocol, or the like. Transceiver 160 may optionally include, or may be connected to, an internal or external antenna 161 able to transmit and/or receive wireless communication signals. In one embodiment, transceiver 160 may be integrated with processor 110, for example, as a single component or as a single Integrated Circuit (IC)

Power source 150 may provide power to one or more components of camera 100, e.g., processor 110, imager 120, illumination unit 130, and/or transceiver 160. In some embodiments, power source 150 may be internal to camera 100, and may include, for example, one or more rechargeable or non-rechargeable batteries or power-cells, such that camera 100 may be self-powered or battery operated, and may not be operatively connected to an external power source. For example, in one embodiment, power source 150 may include one or more "AA" batteries, one or more "AAA" batteries, or the like.

Triggering unit 180 may include, for example, a triggering source, a motion detector, a movement sensor, a fire detector, a smoke detector, a temperature sensor, an impact sensor, a touch sensor, an entry detector, an exit detector, a volume sensor, an audio sensor, a sound sensor, or other sensor, monitor or detector able to generate a signal indicating a triggering event. The triggering event may include, for example, a motion or movement in proximity to camera 100 or in the field-of-view of imager 120, an entrance or an exit of a person to an area or a room monitored by camera 100, a change of a property of an area or room monitored by camera 100, or the like. In one embodiment, the triggering event may include, for example, reception of a triggering command from an input unit or a command unit, e.g., through a wired or wireless communication link.

In some embodiments, upon detection or sensing of a triggering event, the triggering unit 180 may generate a signal ("triggering signal"), which may be transferred, for example, to processor 110 and/or to imager 120. The triggering signal may, for example, trigger imager 120 (e.g., directly or through processor 110) to acquire one or more images.

Control unit 190 may include, for example, an interface 191, an alarm 195, a transceiver 196, and a memory unit 198. Control unit 190 may be implemented, for example, as a device able to be operatively connected to camera 100 and able to control camera 100. In some embodiments, control unit 190 may be implemented as one or more modules or sub-units, for example, a media gateway sub-unit or module able to communicate with camera 100, an input module or sub-unit able to receive user input, a communication module or sub-unit able to communicate with camera 100, a controller module or sub-unit able to provide instructions to control the operation or the status of camera 100, or other suitable modules or sub-units. Transceiver 196 may include, for example, a two-way wireless transceiver. For example, transceiver 196 may receive image data acquired by camera 100, and/or may transmit instructions to camera 100.

Transceiver 196 may include, for example, a transmitter-receiver unit or a transmitter unit and a receiver unit, and may operate in accordance with one or more wireless communication standards or protocols, for example, Bluetooth, ZigBee, 802.11, 802.11a, 802.11b, 802.11g, 802.16, Wi-Fi, WiMax, a proprietary wireless communication protocol, a customized or modified wireless communication protocol, or the like. Transceiver 196 may optionally include, or may be connected to, an internal or external antenna 197 able to transmit and/or receive wireless communication signals.

Interface 191 may include, for example, an input unit allowing a user to provide instructions to activate, de-activate or otherwise control camera 100. In some embodiments, for example, interface 191 may optionally include a keypad 192 allowing a user (e.g., an authorized user or a system manager) to input a password, Personal Identification Number (PIN) or a code, which may be required for providing further instructions to camera 100. In some embodiments, interface 191 may optionally include an "arm" button 193, e.g., a button allowing a user to provide a command to arm or activate the camera 100, and/or a "disarm" button 194, e.g., a button allowing a user to provide a command to disarm or de-activate the camera 100. Other suitable components may be included with, or may be associated with, interface 191, for example, a sub-unit for physical security authentication which may require a user to turn a key or pass a card in order to provide commands to camera 100.

Alarm 195 may include, for example, a unit able to provide a pre-defined alert notification, e.g., an audible alert, a visual alert, a message or indication of alert, or the like.

Memory unit 198 may, for example, store data of one or more images acquired by camera 100. The data stored in memory unit 198 may be non-compressed, compressed or encoded, e.g., in accordance with JPEG standard, Motion JPEG (M-JPEG) standard, Moving Picture Experts Group (MPEG) standard, MPEG-2 standard, MPEG-4 standard, or other suitable compression standards or encoding standards. Memory unit 198 may include, for example, a Random Access Memory (RAM), a Dynamic RAM (DRAM), a Synchronous DRAM (SD-RAM), a Flash memory, a memory card, a memory stick, a volatile memory, a non-volatile memory, a cache memory, a buffer, a short term memory unit, a long term memory unit, a hard disk drive, a floppy disk drive, a Compact Disk (CD) drive, a CD-ROM drive, or other suitable removable or non-removable storage units or memory units.

In accordance with some embodiments of the invention, system 170 may have one or multiple modes of operations, for example, a disarmed mode, an armed mode, and an arming mode. Other suitable modes of operations may be used in accordance with embodiments of the invention, for example, a connected mode, a disconnected mode, a test mode, an initialization mode, an installation or calibration mode, an idle mode, or the like.

In some embodiments, system 170 may be brought into disarmed mode, for example, by entering a disarm command through control unit 190, e.g., using interface 191, keypad 192 and/or disarm button 194. Upon entering a disarm command, transceiver 196 of control unit 190 may transmit a signal indicating the disarm command ("disarm signal"). Transceiver 160 of camera 100 may receive the disarm signal, and may indicate to processor 110 that a disarm signal was received. In response to the disarm signal, processor 110 may de-activate, or modify the operational status of, one or more components of camera 100.

For example, in response to the disarm signal, the operational status of imager 120, processor 110 and/or illumination unit 130 may be modified or set to a power-saving mode, a "sleep" mode, a stand-by mode, or other suitable operational status which may not have full operational functionality. In one embodiment, for example, in response to a disarm signal, transceiver 160 may remain operational, whereas substantially all other components of camera 100 may be turned-off, de-activated, or set to a power-saving mode, a "sleep" mode, a stand-by mode, or other suitable operational status which may not have full operational functionality. This may allow, for example, reduced power consumption by one or more components of camera 100 in response to a disarm signal. In some embodiments, a searching or "sniffing" time interval of the transceiver 160 may be increased or extended in disarmed mode, e.g., to further reduce power consumption by the transceiver 160.

In some embodiments, system 170 may be brought into armed mode, for example, by entering an arm command through control unit 190, e.g., using interface 191, keypad 192 and/or arm button 193. Upon entering an arm command, transceiver 196 of control unit 190 may transmit a signal indicating the disarm command ("arm signal"). Transceiver 160 of camera 100 may receive the arm signal, and may indicate to processor 110 that an arm signal was received. In response to the arm signal, processor 110 may activate, or modify the operational status of, one or more components of camera 100.

In one embodiment, in response to the arm signal, an arming process may be performed in camera 100. For example, in some embodiments, in response to the arm signal, the triggering unit 180 may be activated or turned on, and may perform a stabilization process.

In some embodiments, in response to the arm signal, the imager 120 may be activated or turned on, a microcode of firmware code and/or a set of configuration values may be written to imager 120, and optionally, the imager 120 may be brought to a stand-by mode, a power-saving mode, or a low-power mode. In one embodiment, optionally, in response to the arm signal, the imager 120 may be activated or turned on, imager 120 may acquire one or more images (or, for example, multiple images, a stream of images, a video clip, or the like) ("pre-event images" or "pre-alarm images"), and optionally, the imager 120 may be brought to a stand-by mode, a power-saving mode, or a low-power mode. This may allow, for example, automatic acquisition of an image reflecting a monitored area substantially at the time in which the arm command was provided by a user. Other suitable operations may be performed in the arming process.

In some embodiments, upon completion of the arming process, camera 100 may be in armed mode. For example, triggering unit 180 may remain operational and may be able to sense or detect a triggering event, e.g., a motion or movement. Upon detection of a triggering event, the triggering unit 180 may generate a triggering signal which may be transferred, for example, to processor 110 and/or to imager 120. The triggering signal may, for example, trigger imager 120 (e.g., directly or through processor 110) to acquire one or more images (or, for example, multiple images, a stream of images, a video clip, or the like) ("event images" or "alarm images"). In one embodiment, for example, event images may be rapidly acquired by imager 120, e.g., within 250 milliseconds of the detection of the triggering event. This may allow, for example, rapid acquisition of images which may include a visual representation of the event sensed by the triggering unit 180. In some embodiments, substantially simultaneously with acquiring the first event image, camera 100 may transmit to control unit 190 a signal indicating that an event occurred, and in response, control unit 190 may, for example, activate the alarm 195 or perform other pre-defined operations.

In one embodiment, after the event images are acquired, imager 120 may optionally acquire one or more additional images (or, for example, multiple images, a stream of images, a video clip, or the like) ("post-event images" or "post-alarm images"). For example, after a delay period of approximately two or five seconds from the acquisition of the last event image, the imager 120 may acquire a post-event image. This may allow, for example, acquisition of images which may include a visual representation of a scene after the triggering event occurred, and in some cases, after the occurrence of the triggering event is completed.

In some embodiments, data representing acquired images (e.g., pre-event images, event images, and post-event image) may be stored in memory unit 121. The stored image data may be transferred or uploaded to control unit 190 ("image data upload"), for example, through a wireless communication link using transceiver 160 of camera 100 and transceiver 196 of control unit 190. In one embodiment, the image data may be stored in control unit 190, for example, in memory unit 198.

In one embodiment, the image data upload may be performed automatically by camera 100, for example, when memory unit 121 is substantially filled with image data and does not have available memory to store additional image data. In another embodiment, the image data upload may be performed automatically by camera 100 upon completion of acquisition of a set of pre-event images, event images, and post-event image resulting from the same triggering event. In yet another embodiment, the image data upload may be performed on demand, e.g., when a user submits an upload command using control unit 190 (e.g., through interface 191).

In some embodiments, the image data upload may be automatically performed periodically, for example, substantially every minute or every five minutes.

In some embodiments, image data may not be automatically transferred or uploaded to control unit 190, and/or may be written-over or deleted (e.g., unless an upload command is submitted by a user). In one embodiment, for example, camera 100 may transmit image data to control unit 190, may receive from control unit 190 an indication (e.g., a confirmation signal or an acknowledgment packet) confirming that the image data was successfully uploaded to control unit 190, and in response may delete the image data stored in camera 100 or allow subsequent image data to be written over the image data uploaded to control unit 190. Other suitable operations may be used to manage the image data in camera 100.

In some embodiments, when system 170 is in disarmed mode, imager 120 may not acquire images, may not be operational or fully operational, and/or may not be exposed to light or to the scene or area monitored by camera 100. In one embodiment, for example, imager 120 may be fully operational and may acquire images during a short period of time, which may begin upon detection of a triggering event, and which may end within a few seconds of the detection of the triggering event. In one embodiment, camera 100 and/or control unit 190 may not store data of more than one image (e.g., a pre-event image) until the detection of the triggering event.

In some embodiments, one or more acknowledgement messages (e.g., acknowledgement packets, acknowledgement signals, confirmation messages, alert messages, or the like) may be used, for example, to confirm or acknowledge receipt of an instruction, execution of an instruction, modification of an operational mode or status, or receipt of data, and/or to notify that a triggering event occurred. In some embodiments, for example, an acknowledgement message may be sent by camera 100 to control unit 190 upon receipt of an arm signal or a disarm signal. In some embodiments, for example, an acknowledgement message may be sent by camera 100 to control unit 190 upon modification of the operational status of camera 190, e.g., from an armed mode to a disarmed mode, or vice versa. In some embodiments, for example, an acknowledgement message may be sent by control unit 190 to camera 100 upon receipt of image data, or upon receipt of parameter data related to image data (e.g., headers, parameters indicating beginning or ending of image data transfers). In some embodiments, for example, an acknowledgement message may be sent by control unit 190 to camera 100, or vice versa, to indicate beginning or ending of a communication session, or to indicate continuation of a previously-started communication session.

Although imager 120, light detector 140 and processor 110 are shown as separate components, embodiments of the invention are not limited in this regard, and may include other suitable implementations. In some embodiments, for example, light detector 140 may be integrated within imager 120; additionally or alternatively, processor 110 may be integrated within imager 120, or may be a sub-unit of imager 120. In one embodiment, imager 120 may be used to perform light detection and/or light measurement operations, e.g., instead of light detector 140. In another embodiment, imager 120 may be used to determine and/or set the operational parameters of imager 120 based on the measured level of light, e.g., instead of processor 110. Other suitable implementations may be used in accordance with embodiments of the invention.

Figure 2:
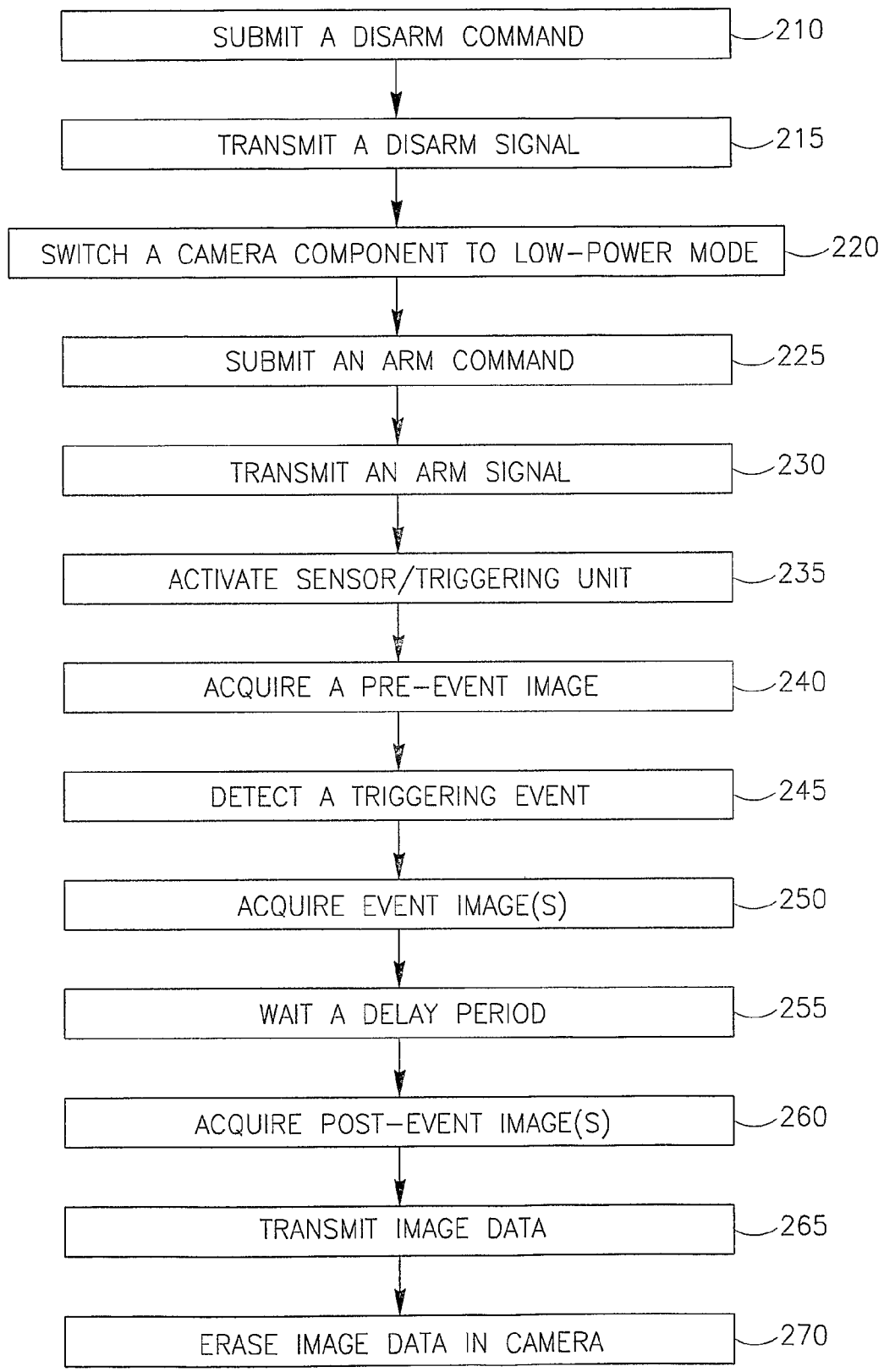
FIG. 2 is a flow-chart diagram of a method of method of low-power imaging in accordance with an embodiment of the invention.

FIG. 2 is a flow-chart diagram of a method of low-power imaging in accordance with an embodiment of the invention.

The method may be used, for example, by system 170 if FIG. 1, or by other suitable devices and/or systems.

The method may include, for example, submitting a disarm command (box 210), e.g., using an interface of a control unit of a security system. A disarm signal may be transmitted (box 215), for example, from the control unit to a camera operatively associated with the control unit, e.g., using a wireless communication link. In response to the disarm signal, one or more components of the camera may be de-activated or switched to a low-power mode or stand-by mode (box 220). In one embodiment, a transceiver of the camera may remain active and operational.

In some embodiments, the method may not proceed to the operations of box 225 and onward, or a time period may elapse before the method proceeds to the operations of box 225 and onward. In alternate embodiments, the method may further include, for example, submitting an arm command (box 225), e.g., using the interface of the control unit of the security system. An arm signal may be transmitted (box 230), for example, from the control unit to the camera. In response to the arm signal, a triggering unit or sensor of the camera may be activated (box 235), and a pre-event image may be acquired by an imager of the camera (box 240).

In some embodiments, the method may not proceed to the operations of box 245 and onward, or a time period may elapse before the method proceeds to the operations of box 245 and onward. In alternate embodiments, the method may proceed to, for example, detecting a triggering event (box 245). In response to the detection of the triggering event, one or more event images may be acquired (box 250). Optionally, after waiting a delay period (box 255), one or more post-event images may be automatically acquired (box 260).

In some embodiments, the method may not proceed to the operations of box 265 and onward, or a time period may elapse before the method proceeds to the operations of box 265 and onward. In alternate embodiments, the method may additionally include, for example, transmitting image data (box 265), e.g., from the camera to the control unit. This may be performed, for example, automatically (e.g., when a memory unit of the camera is substantially filled with image data or video data and does not have available memory to store additional image data or video data); upon completion of acquisition of a set of pre-event images, event images, and post-event image resulting from the same triggering event; on demand (e.g., when a user submits an upload command using the control unit); automatically and periodically, for example, substantially every minute or every five minutes; or when other pre-defined conditions are met. Optionally, image data stored in the camera may be erased (box 270), e.g., to allow storage of a subsequent set of acquired images' data.

In some embodiments, additional or alternate operations may be used. For example, image acquisition operations (e.g., box 240, box 250, and box 260) may further include storing the acquired image data in a short-term memory unit or a long-term memory unit, and optionally compressing or encoding the image data in accordance with a compression or encoding algorithm or standard.

Other suitable operations or sets of operations may be used in accordance with embodiments of the invention.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A device comprising:
an imager to acquire one or more images, associated with an integrated image signal processor;
a triggering sensor to sense a triggering event; and
a receiver to receive signals, from a control unit enabling user-selectable arm/disarm mode control of the imager and the triggering sensor operatively connected to the control unit, through a 2-way wireless communication link between the receiver and the control unit;
wherein the device, responsive to a disarm signal received by the control unit and transmitted to the receiver through the 2-way wireless communication link, is operative to enter a disarm mode, in which the receiver is operational and the imager and the triggering sensor are operative at reduced power, relative to a full mode of operation characterizing the imager and triggering sensor when the control unit is operating responsive to an arming signal, and, in response to the disarm signal, the processor is operational but has a status having less than full operational functionality.

2. The device of claim 1, wherein the receiver is to receive a signal indicating a disarm command, and wherein in response to said signal the imager and the triggering sensor are to enter a non-operational mode.

3. The device of claim 1, wherein the receiver is to receive a signal indicating an arm command, and wherein in response to said signal the imager is to enter a stand-by mode and the triggering sensor is to enter an operational mode.

4. The device of claim 2, wherein the signal comprises a wireless communication signal.

5. The device of claim 3, wherein the signal comprises a wireless communication signal.

6. The device of claim 1, further comprising: a transmitter to transmit data of one or more images acquired by the imager.

7. The device of claim 6, wherein the transmitter comprises a wireless transmitter.

8. The device of claim 7, wherein the transmitter is to transmit the data in response to a received signal indicating a command to transmit the data.

9. The device of claim 1, wherein a search interval of the receiver in said disarm mode is greater than a search interval of the receiver in an arm mode.

10. The device of claim 1, wherein while the device is in an arm mode and in response to a triggering event, the imager is to acquire a first image, to wait a pre-defined time period, and to acquire a second image.

11. The device of claim 1, further comprising a power source to provide power to the receiver when the device is in said disarm mode, and to provide power to the receiver, the imager and the triggering sensor when the device is in said arm mode.

12. A system comprising:
a control unit; and
a device comprising:
an imager to acquire one or more images, associated with an integrated image signal processor;
a triggering sensor to sense a triggering event for triggering the imager; and
a receiver to receive signals, from the control unit enabling user-selectable arm/disarm mode control of the imager and the triggering sensor operatively connected to the control unit, through a 2-way wireless communication link between the receiver and the control unit;
wherein the device, responsive to a disarm signal received by the control unit and transmitted to the receiver through the 2-way wireless communication link, is operative to enter a disarm mode, in which the receiver is operational and the imager and the triggering sensor are operative at reduced power, relative to a full mode of operation characterizing the imager and the triggering sensor when the control unit is operating responsive to an arming signal, and in response to the disarm signal, the processor is operational but has a status having less than full operational functionality.

13. The system of claim 12, wherein the receiver is to receive a signal indicating a disarm command, and wherein in response to said signal the imager and the triggering sensor are to enter a non-operational mode.

14. The system of claim 12, wherein the receiver is to receive a signal indicating an arm command, and wherein in response to said signal the imager is to enter a stand-by mode and the triggering sensor is to enter an operational mode.

15. The system of claim 12, wherein a search interval of the receiver in said disarm mode is greater than a search interval of the receiver in an arm mode.

16. The system of claim 12, wherein in response to a triggering event the imager is to acquire a first image, to wait a pre-defined time period, and to acquire a second image.

17. A method comprising:
providing an imager to acquire one or more images, associated with an integrated image signal processor, a triggering sensor to sense a triggering event, and a receiver to receive signals;
using the receiver for receiving a signal indicating an arm command; and
in response to the received signal, using the imager for acquiring a pre-event image,
wherein the receiver is able to receive signals from a control unit enabling user-selectable arm/disarm mode control of the imager and the triggering sensor operatively connected to the control unit, through a 2-way wireless communication link between the receiver and the control unit; and wherein responsive to a disarm signal received by the control unit and transmitted to the receiver through the 2-way wireless communication link, a disarm mode is entered in which the receiver is operational and the imager and the triggering sensor are operative at reduced power, relative to a full mode of operation characterizing the imager and the triggering sensor when the control unit is operating responsive to an arming signal, and, in response to the disarm signal, the processor is operational but has a status having less than full operational functionality.

18. The method of claim 17, comprising: in response to said signal, setting an imager to enter a stand-by mode and setting a triggering sensor to enter an operational mode.

19. The method of claim 18, comprising: in response to said signal, decreasing a search interval of the receiver.

20. The method of claim 17, further comprising: in response to a signal indicating a disarm command, setting the receiver to enter an operational mode and setting the imager and a triggering sensor to enter a non-operational mode.

21. The device of claim 1 wherein an illumination unit is associated with the imager, and wherein, in response to the disarm signal, the illumination unit is operational but has a status having less than full operational functionality.

22. The device of claim 1 wherein said status having less than full operational functionality comprises at least one of a power-saving mode, a "sleep" mode, and a stand-by mode.

23. The device of claim 1 wherein said status having less than full operational functionality comprises at least one of a power-saving mode, a "sleep" mode, and a stand-by mode.

24. A security system comprising:

a control unit; and a camera, including three or more components, the three or more components including an imager associated with an integrated image signal processor, a triggering sensor, and a receiver to receive signals from the control unit through a 2-way wireless communication link, wherein the imager and the triggering sensor each has a plurality of selectable states including an armed mode or a disarmed mode, and wherein the imager and the triggering sensor are operatively connected to the control unit, through the two-way wireless communication link, and wherein the control unit allows a user to bring said imager and said triggering sensor into a selectable one of said armed and disarmed modes, and wherein, when in disarmed mode, said imager and said triggering sensor operate in a reduced-power mode, and, when in disarmed mode, the processor is operational but has a status having less than full operational functionality.

* * * * *